(12) United States Patent
Ramamurthy et al.

(10) Patent No.: US 9,674,809 B1
(45) Date of Patent: Jun. 6, 2017

(54) MANAGEMENT OF COMPONENT CARRIERS BASED ON TIME SEGMENT COORDINATION

(71) Applicant: Sprint Spectrum L.P., Overland Park, KS (US)

(72) Inventors: Suryanarayanan Ramamurthy, Olathe, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 284 days.

(21) Appl. No.: 14/543,465

(22) Filed: Nov. 17, 2014

(51) Int. Cl.
*H04L 5/00* (2006.01)
*H04W 56/00* (2009.01)
*H04W 72/04* (2009.01)
*H04W 92/10* (2009.01)

(52) U.S. Cl.
CPC .......... *H04W 56/002* (2013.01); *H04L 5/0053* (2013.01); *H04W 72/042* (2013.01); *H04W 72/0453* (2013.01); *H04W 72/0486* (2013.01); *H04W 92/10* (2013.01)

(58) Field of Classification Search
CPC ............ H04W 72/042; H04W 72/0446; H04L 27/2627
See application file for complete search history.

(56) References Cited

U.S. PATENT DOCUMENTS

| 2007/0141995 | A1 | 6/2007 | Youn et al. |
| 2008/0253319 | A1 | 10/2008 | Ji et al. |
| 2010/0039950 | A1 | 2/2010 | Kazmi |
| 2010/0067469 | A1* | 3/2010 | Gaal ................... H04W 72/082 370/329 |
| 2010/0232318 | A1 | 9/2010 | Sarkar |
| 2011/0111779 | A1 | 5/2011 | Krishnamurthy et al. |
| 2011/0194630 | A1* | 8/2011 | Yang .................... H04L 1/0025 375/260 |
| 2011/0255486 | A1* | 10/2011 | Luo ........................ H04W 48/12 370/329 |
| 2012/0320855 | A1 | 12/2012 | Tesanovic et al. |
| 2013/0003591 | A1 | 1/2013 | Novak et al. |
| 2013/0058315 | A1 | 3/2013 | Feuersanger et al. |
| 2013/0114517 | A1 | 5/2013 | Blankenship et al. |

(Continued)

OTHER PUBLICATIONS

U.S. Appl. No. 14/531,628, filed Nov. 3, 2014.

(Continued)

*Primary Examiner* — Hoon J Chung
*Assistant Examiner* — Zhensheng Zhang

(57) ABSTRACT

A method and system for managing time segments per subframe used for downlink control channel communication by adjacent base stations that each provide carrier-aggregation service on first and second component carriers. The base stations may work with each other to differentially structure the component carriers, such that the base stations use different time segments than each other for downlink control channel communication on the first component carrier but the same time segments as each other for downlink control channel communication on the second component carrier. Further, based on this differential structuring, the base stations may then schedule transmission of one type of data on the first component carrier and another type of data on the second component carrier.

20 Claims, 8 Drawing Sheets

(56) References Cited

U.S. PATENT DOCUMENTS

| | | |
|---|---|---|
| 2013/0195048 A1 | 8/2013 | Ekpenyong et al. |
| 2013/0272229 A1 | 10/2013 | Dinan |
| 2014/0105157 A1* | 4/2014 | Yang .................... H04L 5/0007 370/329 |
| 2014/0119349 A1 | 5/2014 | Takano |
| 2014/0211748 A1 | 7/2014 | Gunnarsson et al. |
| 2015/0382290 A1* | 12/2015 | Yaacoub ........... H04W 52/0206 370/311 |

OTHER PUBLICATIONS

A. Daeinabi, et al., "An Intercell Interference Coordination Scheme in LTE Downlink Networks based on User Priority and Fuzzy Logic System," International Journal of Wireless & Mobile Networks (IJWMN) vol. 5, No. 4, Aug. 2013.
SCell PRACH Transmission, R1-123276, GPP TSG-RAN WG1 Meeting #70, Qingdao, China, Aug. 13-17, 2012.
"Remaining issues on PRACH handling and its power-control," R1-144141, 3GPP TSG RAN WG1 Meeting #78bis, Ljubljana, Slovenia, Oct. 6-10, 2014.
First Action Interview Pilot Program Pre-Interview Communication from U.S. Appl. No. 14/719,602, dated Sep. 15, 2016.
First Action Interview Pilot Program Pre-Interview Communication from U.S. Appl. No. 14/531,628, dated Jul. 13, 2016.

\* cited by examiner

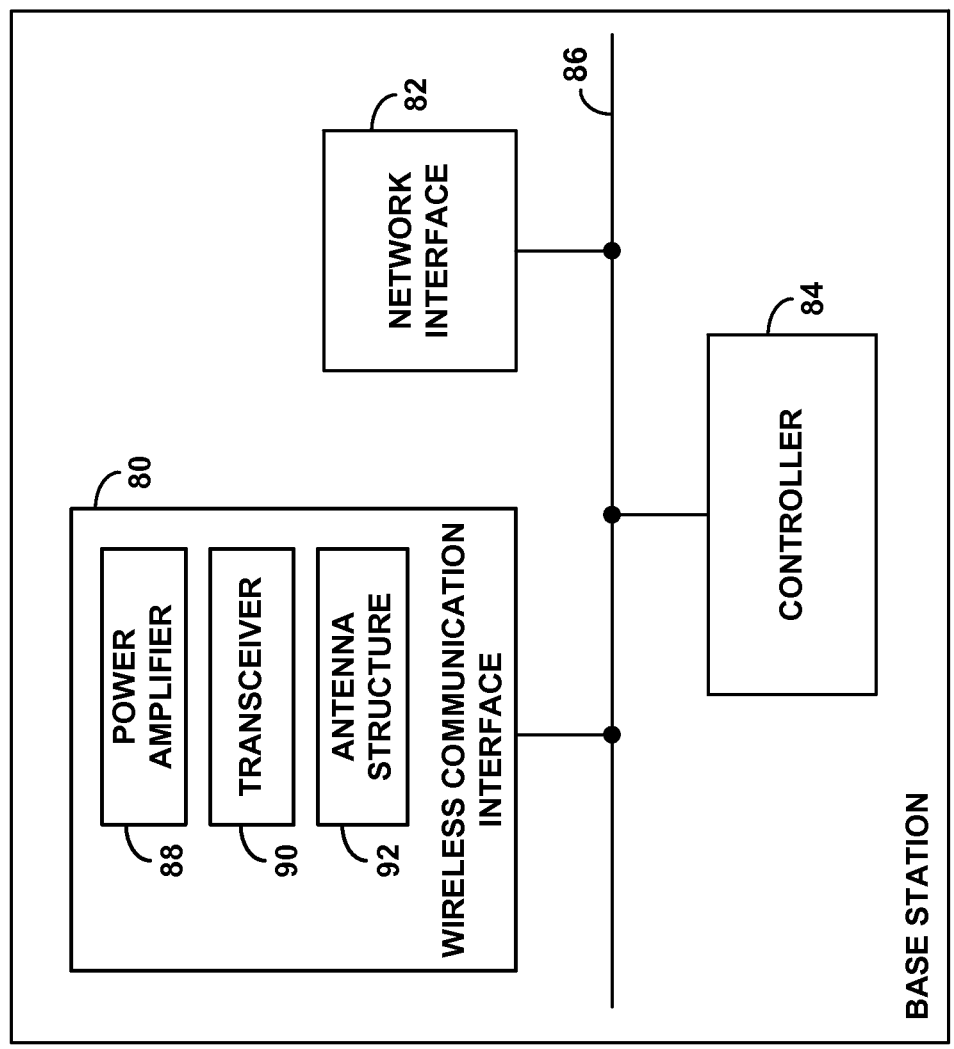

MANAGEMENT OF COMPONENT CARRIERS BASED ON TIME SEGMENT COORDINATION

REFERENCE TO RELATED APPLICATION

This disclosure is related to the disclosure of U.S. patent application Ser. No. 14/531,628, filed Nov. 3, 2014, the entirety of which is hereby incorporated by reference.

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz, with each carrier in a cover area defining a respective "cell." On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

In LTE, downlink air interface resources are mapped in the time domain and in the frequency domain. In the time domain, LTE defines a continuum of 10-millisecond (ms) frames, divided into 1 ms sub-frames and 0.5 ms slots. With this arrangement, each sub-frame is considered to be a transmission time interval (TTI). Thus, each frame has 10 TTIs, and each TTI has 2 slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), in one OFDM symbol.

LTE further defines a particular grouping of time-domain and frequency-domain resources as a downlink resource block. In the time domain, each downlink resource block has a duration corresponding to one sub-frame (1 ms) or one slot (0.5 ms). In the frequency domain, each downlink resource block consists of a group of 12 sub-carriers that are used together to form OFDM symbols. Typically, a 1 ms duration of a downlink resource block accommodates 14 OFDM symbols, each spanning 66.7 microseconds, with a 4.69 microsecond guard band (cyclic prefix) added to help avoid inter-symbol interference. Depending on the bandwidth of the downlink carrier, the air interface may support transmission on a number of such downlink resource blocks in each TTI. For instance, a 5 MHz carrier supports 25 resource blocks in each TTI, whereas a 15 MHz carrier supports 75 resource blocks in each TTI.

The smallest unit of downlink resources is the resource element. Each resource element corresponds to one sub-carrier and one OFDM symbol. Thus, a resource block that consists of 12 sub-carriers and 14 OFDM symbols has 168 resource elements. Further, each OFDM symbol and thus each resource element can represent a number of bits, with the number of bits depending on how the data is modulated. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits.

Within a resource block, and cooperatively across all of the resource blocks of the carrier bandwidth, different resource elements can have different functions. In particular, a certain number of the resource elements (e.g., 8 resource elements distributed throughout the resource block) may be reserved for reference signals used for channel estimation. In addition, a certain number of the resource elements (e.g., resource elements in the first one, two, or three OFDM symbols) may be reserved for the PDCCH and other control channels (e.g., a physical hybrid automatic repeat request channel (PHICH)), and most of the remaining resource elements (e.g., most of the resource elements in the remaining OFDM symbols) would be left to define the PDSCH.

Across the carrier bandwidth, each TTI of the LTE air interface thus defines a control channel space that generally occupies a certain number of 66.7 microsecond symbol time segments (e.g., the first one, two, or three such symbol time segments), and a PDSCH space that generally occupies the remaining symbol time segments, with certain exceptions for particular resource elements. With this arrangement, in the frequency domain, the control channel space and PDSCH space both span the entire carrier bandwidth. In practice, the control channel space is then treated as being a bandwidth-wide space for carrying control signaling to UEs. Whereas, the PDSCH space is treated as defining discrete 12-subcarrier-wide PDSCH segments corresponding to the sequence of resource block across the carrier bandwidth.

One of the main functions of the PDCCH in LTE is to carry "Downlink Control Information" (DCI) messages to served UEs. LTE defines various types or "formats" of DCI messages, to be used for different purposes, such as to indicate how a UE should receive data in the PDSCH of the current TTI, or how the UE should transmit data on the PUSCH in an upcoming TTI. For instance, a DCI message in a particular TTI may schedule downlink communication of bearer data to a particular UE (i.e., a UE-specific data transmission), by specifying one or more particular PDSCH segments that carry the bearer data in the current TTI, what modulation scheme is used for that downlink transmission, and so forth. And as another example, a DCI message in a particular TTI may indicate the presence of one or more paging messages carried in particular PDSCH segments and may cause certain UEs to read the PDSCH in search of any relevant paging messages.

Each DCI message may span a particular set of resource elements on the PDCCH (e.g., one, two, four, or eight control channel elements (CCEs), each including 36 resource elements) and may include a cyclic redundancy check (CRC) that is masked (scrambled) with an identifier (e.g., a particular radio network temporary identifier (RNTI)). In practice, a UE may monitor the PDCCH in each TTI in search of a DCI message having one or more particular RNTIs. And if the UE finds such a DCI message, the UE may then read that DCI message and proceed as indicated. For instance, if the DCI message schedules downlink communication of bearer data to the UE in particular PDSCH segments of the current TTI, the UE may then read the indicated PDSCH segment(s) of the current TTI to receive that bearer data.

Furthermore, a recent revision of LTE known as LTE-Advanced now permits a base station to serve a UE with "carrier aggregation," by which the base station schedules bearer communication with the UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between an eNodeB and a UE using a single carrier is 20 MHz. Using carrier aggregation, an eNodeB may increase the maximum bandwidth to up to 100 MHz by aggregating up to five carriers. Each aggregated carrier is referred to as a "component carrier." In some carrier-aggregation implementations, each component carrier will have its own control channel space (e.g., PDCCH) and its own PDSCH space, with its control channel space carrying DCIs to schedule data transmission in its PDSCH space.

OVERVIEW

In a wireless communication system in which multiple base stations provide wireless coverage areas each defining a continuum of subframes divided into time segments (such as but not limited to an LTE system), all of the base stations may be arranged by default to provide their control channels (e.g., PDCCH) in the first time segments of each subframe and to then use the remaining time segments of each subframe for the shared channel (e.g., PDSCH). For instance, in LTE as noted above, each base station may provide its control channel space in the first one, two, or three symbol time segments per subframe, leaving the remaining symbol time segments largely for use to define the PDSCH. Further, where base stations provide carrier aggregation service, they may use this default arrangement on each of their component carriers.

A problem that can arise with this default arrangement, however, is that control channel communication in one such coverage area on a particular carrier could interfere with control channel communication in an overlapping coverage area on the same carrier. This problem could arise in any scenario where two or more base stations operate on the same component carriers as each other and provide overlapping coverage areas. By way of example, this could occur in a scenario where a wireless service provider operates a macro base station (e.g., a typical cell tower) that provides a wide coverage area and carrier-aggregation service on particular component carriers and where one or more small cell base stations (e.g., femtocells, picocells or the like) are in use within the macro coverage area and provide carrier-aggregation service on the same component carriers.

Unfortunately, such control channel interference can produce load issues with respect to both the control channel and the shared traffic channel on a given carrier. For instance, the interference between control channel communications could result in UEs failing to receive control signaling, which could necessitate retransmission of the control signaling and thus lead to an increase in control channel load. Further, to the extent control signaling in particular TTIs schedules downlink data transmission in the same TTIs, failure to receive that control signaling could also mean failure to receive the associated downlink data transmission, which could necessitate retransmission of the data and thus lead to an increase in traffic channel load. These issues can in turn result in reduced throughput and other undesirable conditions. Consequently, an improvement is desired.

Disclosed herein is a method and corresponding apparatus to help overcome this problem. In accordance with one aspect of this disclosure, adjacent base stations may programmatically work with each other to arrange for their respective use of different time segments per subframe for their respective control channel use. Further, to additionally help avoid interfering with control channel communications, each base station may also avoid downlink data communication in the symbol time segments per subframe that the other base station will be using for control channel communication. For instance, of the 14 OFDM symbol time segments in each LTE subframe, two base stations that provide overlapping coverage may engage in signaling with each other to arrange for one of the base stations to use two particular ones of the symbol time segments for its PDCCH and for the other base station to use two other particular ones of the symbol time segments for its PDCCH, and each base station may exclude from its PDSCH the symbol time segments per subframe that are designated for PDCCH use by the other base station.

Such an arrangement may help to avoid or minimize control channel interference between the base stations. However, one drawback of the arrangement is that it may reduce the number of symbols per subframe available for PDSCH use, thus limiting scheduled data throughput. This reduced throughput may not matter for certain types of communications, such as e-mail and other short, non-real-time communications. However, it may be an issue for certain higher capacity communications and latency-sensitive communications, such as video-streaming or gaming communications. Moreover, some such higher capacity communications may be scheduled persistently (e.g., with advanced persistent or semi-persistent scheduling) and may therefore involve less PDCCH communication and consequently less likelihood of control channel interference.

In a system where base stations provide carrier-aggregation service, a solution to this problem is to apply the above process on one particular component carrier but not on another component carrier and then have the base stations select which component carrier to use for particular types of communications based on characteristics of the communications such as desired throughput, latency-sensitivity, and scheduling-persistence.

For instance, if we assume that both base stations provide carrier-aggregation service on the same component carriers as each other, including a combination of a first component carrier and a second component carrier, the base stations (i) could arrange to use different time segments per subframe than each other for their downlink control channel communication on the first component carrier (and to each forgo downlink traffic channel communication in the time segments per subframe on the first component carrier that the other base station will be using for downlink control channel communication), but (ii) could by default use the same time segments per subframe as each other for their downlink control channel communication on the second component carrier.

Based on this difference in structuring between the first component carrier and the second component carrier, either or each base station may then select a component carrier on which to schedule particular data transmission. For example, when either or each base station is going to transmit to a UE data that is relatively high capacity (e.g., high-throughput requirement), relatively latency-sensitive, and/or persistently or semi-persistently scheduled, the base station may provide that transmission on the second component carrier, on grounds that second component carrier may have a greater number of time segments per subframe available for scheduled traffic use than the first component carrier, and that such communication may not pose as much of an issue with control channel interference and so the second component carrier without the base stations using different time segments per subframe for control channel communication may work fine. Whereas, when either or each base station is going to transmit to a UE data that is not as high capacity, not as latency sensitive, and/or not as persistently scheduled, the base station may provide that transmission on the first component carrier, on grounds that first component carrier may have fewer time segments per subframe available for scheduled traffic use and that such communication may benefit from the arrangement for the base stations to use different time segments per subframe for their control channel communication.

Accordingly, in one respect, disclosed is a method operable in a wireless communication system in which first and second adjacent base stations provide respective coverage areas in which to serve UEs, the base stations being time synchronized with each other for air interface communications in their respective coverage areas, each coverage area defining a continuum of subframes each divided into a sequence of time segments for communicating modulated data, and the second base station providing carrier aggregation service on component carriers.

According to the method, the first base station provides carrier-aggregation service on the same component carriers on which the second base station provides carrier-aggregation service, including a first component carrier and a second component carrier. Further, the first base station differentially structures downlink channels on the component carriers, including (i) on the first component carrier, providing control channel space in different ones of the time segments per subframe than time segments per subframe in which the second base station will provide control channel space on the first component carrier, but (ii) on the second component carrier, providing control channel space in the same time segments per subframe in which the second base station will provide control channel space on the second component carrier. Based on that differential structuring of the downlink channels on the component carriers, the base station then transmits a first type of data in traffic channel space on the first component carrier and transmits a second type of data in traffic channel space on the second component carrier.

In another respect, disclosed is a wireless communication system that includes a first base station configured to provide a first coverage area on first and second component carriers and a second base station configured to provide a second coverage area also on the first and second component carriers, the first and second coverage areas overlapping with each other and both defining a common continuum of subframes each divided into a sequence of time segments for communicating modulated data on the component carriers.

In the disclosed system, the first and second base stations are configured to differentially structure downlink channels on the first and second component carriers, including (a) engaging in signaling with each other to arrange for (i) the first base station to use a first set of one or more of the time segments per subframe for downlink control channel communication on the first component carrier, and (ii) the second base station to use a second set of one or more of the time segments per subframe for downlink control channel communication on the first component carrier, but (b) both base stations being configured to use the same time segments per subframe as each other for downlink control channel communication on the second component carrier. Further, the first and second base stations are configured, based on the differential structuring of the downlink channels on the first and second component carriers, to transmit a first type of data in downlink traffic channel space on the first component carrier and to transmit a second type of data in downlink traffic channel space on the second component carrier.

In still another respect, disclosed is a base station arranged to carry out various features of the disclosed method. The base station includes a wireless communication interface configured to provide a wireless coverage area in which to serve UEs with carrier-aggregation service on a plurality of component carriers including a first component carrier and a second component carrier, where, on each component carrier, the coverage area defining a continuum of subframes each divided into a sequence of time segments for communicating modulated data. Further, the base station includes a controller configured to manage use of time segments per subframe in accordance with the disclosure.

In particular, the controller is configured to differentially structure downlink channels on the component carriers, including (i) on the first component carrier, providing control channel space in different ones of the time segments per subframe than time segments per subframe in which an adjacent second base station will provide control channel space on the first component carrier, but (ii) on the second component carrier, providing control channel space in the same time segments per subframe in which the adjacent second base station will provide control channel space on the second component carrier. Further, the controller is configured, based on the differential structuring of the downlink channels on the component carriers, (i) to cause the base station to transmit a first type of data in traffic channel space on the first component carrier due to the first type of data being of the first type, and (ii) to cause the base station to transmit a second type of data in the traffic channel space on the second component carrier due to the second type of data being of the second type.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 8 is a simplified block diagram of an example base station operable in accordance with the disclosure.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
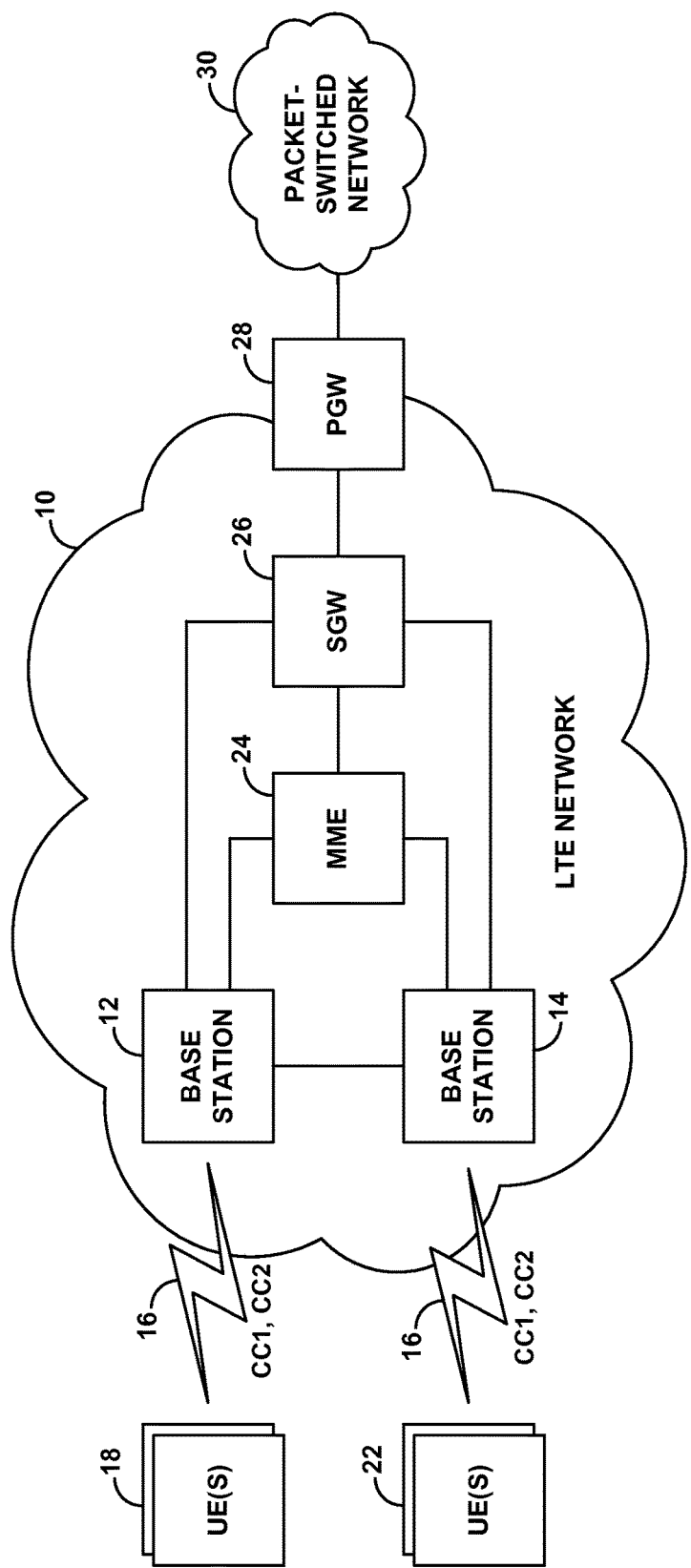
FIG. 1 is a simplified block diagram of an example wireless communication system in which features of the present disclosure can be implemented.

Referring to the drawings, as noted above, FIG. 1 is a simplified block diagram of an example wireless communication system in which features of the present disclosure can be implemented. In particular, FIG. 1 depicts a representative LTE network 10, which functions primarily to serve UEs with wireless packet data communication service, including possibly voice-over-packet service, but may also provide other functions. As shown, the LTE network includes two representative LTE base stations (evolved Node-Bs (eNodeBs)) 12, 14, each of which would have an antenna structure and associated equipment for providing a respective LTE coverage area in which to serve UEs. By way of example, eNodeB 12 is shown providing a coverage area 16 in which to serve one or more UEs 18, and eNodeB 14 is shown providing a coverage area 20 in which to serve one or more UEs 22. The UEs may take various forms, such as any of those noted above, whether or not operated by a human "user."

In practice, these base stations may be adjacent to each other in the wireless communication system. This adjacent relationship between the base stations could be defined in various ways. For instance, the base stations could be considered adjacent to each other if the base stations' respective coverage areas overlap with each other in whole or in part, as may be established by one or more UEs served by one of the base stations reporting to the serving base station that the UE(s) are detecting signals from the other base station. Alternatively or additionally, the base stations could be considered adjacent to each other simply if at least one of the base stations lists the other base station on a neighbor list useable to manage handover of UEs between the base stations. Physically, the base stations can be co-located or distributed at some distance from each other.

Further, the base stations themselves can take various forms. By way of example, either or each base station could be a macro base station of the type typically provided by a wireless service provider with a tower mounted antenna structure and associated equipment. Or either or each base station could be a small cell base station (such as a femtocell, picocell, or the like) typically provided to help improve coverage within macro cell coverage and usually having a much smaller form factor and coverage range than a macro base station. As a specific example, base station 12 could be a macro base station, and base station 14 could be a small cell base station positioned at least partially within coverage of the macro base station. Thus, the two base stations would provide overlapping coverage.

As further shown in the example arrangement of FIG. 1, the base stations have a communication interface (e.g., an LTE "X2" interface) with each other, and each base station has a communication interface with a mobility management entity (MME) 24 that functions as a signaling controller for the LTE network and may also facilitate communication between the base stations. Further, each base station then has a communication interface with a serving gateway (SGW) 26, which in turn has a communication interface with a packet-data network gateway (PGW) 28 that provides connectivity with a packet-switched network 30, and the MME 24 has a communication interface with the SGW 26. In practice, the illustrated components of the LTE network may sit as nodes on a private packet-switched network owned by an operator of the LTE network, and thus the various communication interfaces may be logical interfaces through that network.

In the example arrangement, each base station serves one or more UEs with carrier-aggregation service on a plurality of component carriers, meaning that each base station serves at least one UE concurrently on multiple component carriers. FIG. 1 depicts such an arrangement where each base station 12, 14 provides such carrier aggregation service on a combination of component carrier CC1 and component carrier CC2. Each of these component carriers may have a respective bandwidth (such as 5 MHz or another carrier bandwidth as discussed above). The carrier aggregation service provided by either base station could also encompass one or more additional component carriers. But, for simplicity, this disclosure will address the scenario where the adjacent base stations both provide carrier-aggregation on the same component carriers including CC1 and CC2, and thus where both base stations may communicate on the same CC1 resources as each other (in time and frequency) and both base stations may communicate on the same CC2 resources as each other (in time and frequency).

As noted above, each base station's coverage area may then define a continuum of subframes in the time domain, with each subframe being divided into a sequence of time segments for communicating modulated data. Further, the base stations may be time synchronized with each other, so that their subframes and time segments within their subframes occur at the same time as each other (possibly with minor tolerance for variation). Thus, each base station's coverage area would start a new subframe at the same time as the other base station's coverage area, and the time segments within a subframe of one base station's coverage area would be aligned in time with the time segments of the other base station's coverage area. This time synchronization could be established by use of GPS timing or another mechanism.

Figure 2:
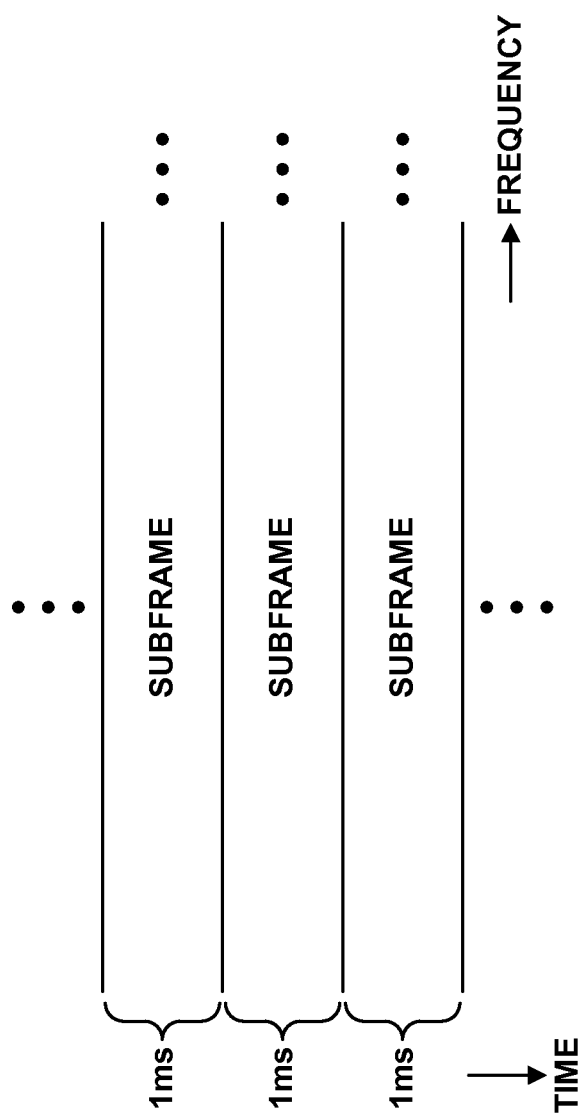
FIG. 2 is an illustration of a portion of an example continuum of subframes.

FIG. 2 depicts a portion of an example continuum of subframes in a representative LTE coverage area, shown within a portion of one example component-carrier bandwidth. As illustrated in FIG. 2, the subframes of the continuum are 1 ms each, and the continuum would continue before and after the portion of time shown. Although the continuum is shown with no separation between the subframes, the continuum could just as well be defined with separation between the subframes. For instance, every other 1 ms could define a next subframe, or some other repeating pattern could define occurrences of subframes.

Figure 3:
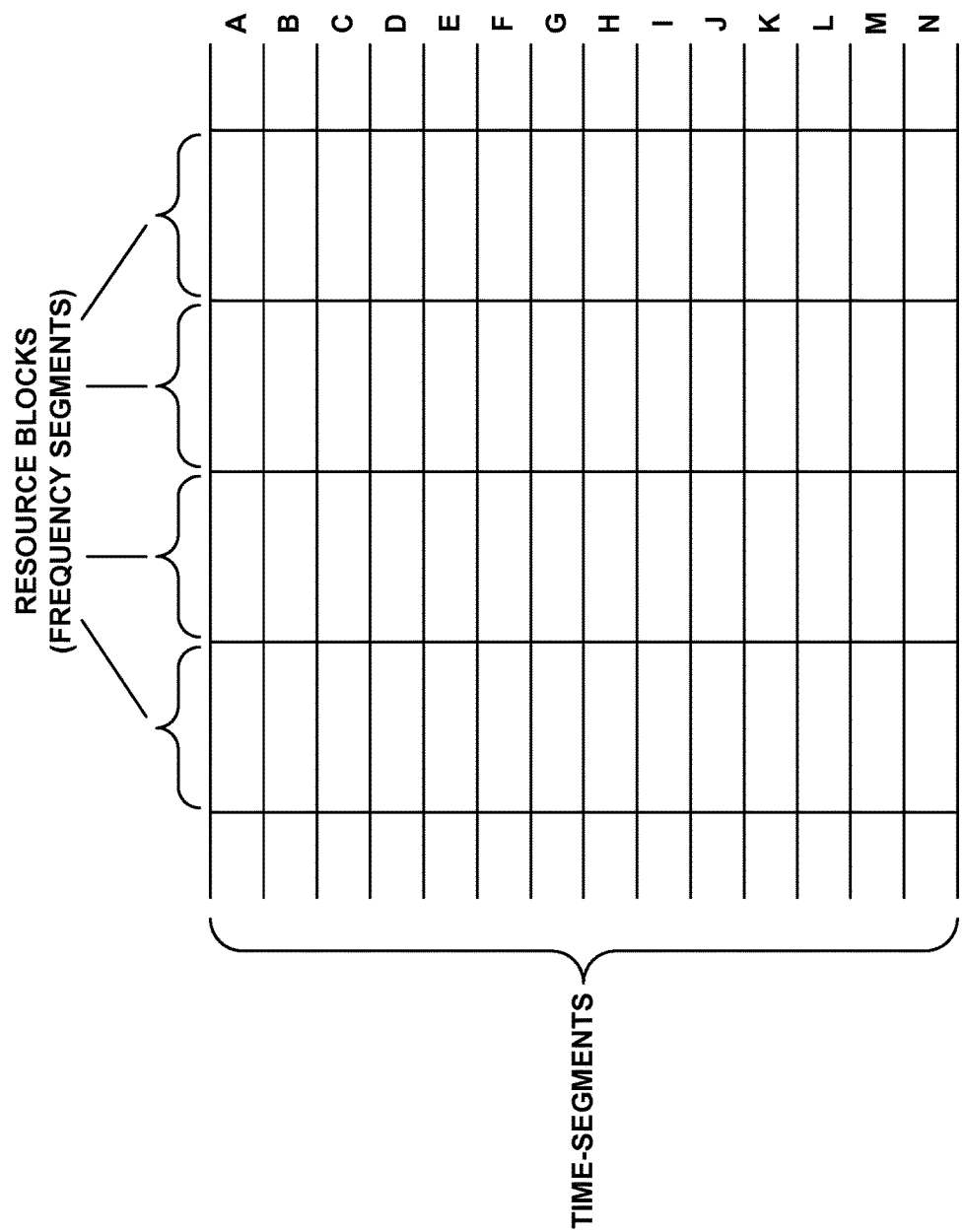
FIG. 3 is an illustration of an example subframe, depicting an example sequence of time segments within the subframe.

FIG. 3 next depicts an example of one of the subframes, also shown within a portion of the example component-carrier bandwidth. As illustrated in FIG. 3, the example subframe is divided over time into a sequence of 14 symbol time segments labeled A through N in their order of occurrence, each of which may be 66.7 microseconds or the like. As with the subframe timing, although the sequence of these time segments is shown with one time segment right after another and with the sequence of time segments spanning the full duration of the subframe, the sequence could be defined in other ways, such as including just certain time segments within the subframe. In practice, the illustrated sequence of time segments may repeat for each successive subframe of the continuum of subframes.

As discussed above, in a typical LTE implementation, the first one, two, or three symbol time segments in each subframe would be used to define downlink control channel space (e.g., for PDCCH and PHICH communication), and the remaining symbol time segments in each subframe would then be used to define downlink shared channel space (e.g., for PDSCH communication), with the understanding that certain resource elements would be reserved for other purposes (such as to carry reference signals for instance).

Figure 4:
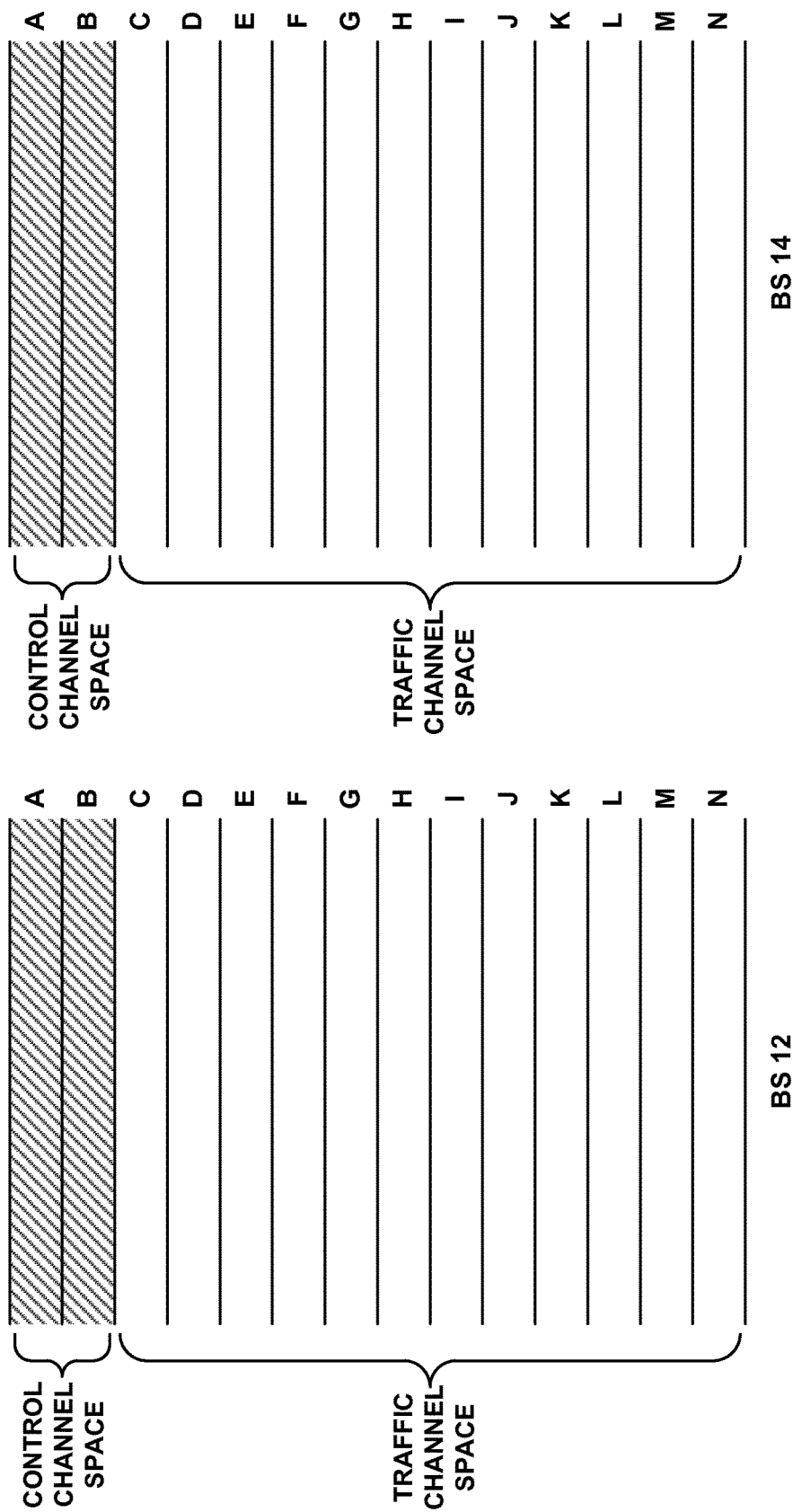
FIG. 4 is an illustration of time synchronized subframes of adjacent base station coverage areas, showing potentially interfering control channel space in the coverage areas.

As further noted above, however, a problem could arise where two adjacent base stations use the same time segments per subframe for their downlink control channel communication on a particular component carrier. FIG. 4 depicts such a situation way of example. In particular, FIG. 4 shows concurrent control-channel subframes of base stations 12 and 14 on the example component carrier. In this arrangement, both base stations use time segments A and B per subframe as their respective downlink control channel space (e.g., for PDCCH and PHICH communication) and both base stations use the remaining time segments C through N per subframe as their respective downlink traffic channel space (e.g., for PDSCH communication). Since the base stations are operating on the same component carrier and provide overlapping coverage, the result of this arrangement may well be interference between their control channel communications, leading to issues such as those noted above.

To help overcome this problem, the present disclosure provides for the base stations to work with each other (e.g., to engage in inter-base station signaling with each other) so as to arrange for their use of different time segments than each other per subframe for their respective downlink control channel communication on a given component carrier, and for each base station to not use for downlink control channel communication the time segments that the other base station will be using for downlink control channel communication on that component carrier. Further, to additionally help avoid interference with control channel communication on that component carrier, each base station may also operate to avoid using for downlink traffic channel communication on the component carrier the time segments that the other base station will be using for downlink control channel communication on the component carrier in accordance with the arrangement for the base stations to use different ones of the time segments per subframe for their respective downlink control channel communication on the component carrier.

In practice, for instance, base station 12 may select one or more time segments for base station 12 to use per subframe for downlink control channel communication on the component carrier and may transmit a signal to base station 14, notifying base station 14 that base station 12 will be using the selected time segment(s) for downlink control channel communication on the component carrier. (The selected time segments per subframe could be contiguous, as is the case with the default LTE control channel space, or could be non-contiguous.) Further, base station 14 may select one or more other time segments for base station 14 to use per subframe for downlink control channel communication on the component carrier, perhaps in response to the signal from base station 12, and may transmit a signal to base station 12 notifying base station 12 that base station 14 will be using the selected time segment(s) for downlink control channel communication on the component carrier. Alternatively, this arrangement process could have one of the base stations managing the allocation of time segments between the base stations for downlink control channel use, such as directing the other base station which time segments per subframe to use, and/or could involve input or directives from one or more other entities, such as MME 24 for instance.

With the agreement in place for one base station to use one set of time segment(s) per subframe for downlink control channel communication on the component carrier and for an adjacent other base station to use a different (mutually exclusive) set of time segment(s) per subframe for downlink control channel communication on the same component carrier, each base station may then engage in downlink control channel communication accordingly on the component carrier. In particular, each base station may provide its downlink control channel communication on the component carrier in the time segment(s) that it is set to use for downlink control channel communication on the component carrier and not in the time segment(s) that the adjacent base station is set to use for downlink control channel communication on the component carrier. Further, each base station may also forgo engaging in downlink traffic channel communication on the component carrier in the time segment(s) that the adjacent base station is set to use for downlink control channel communication on the component carrier.

In addition, each base station may notify its served UEs which time segment(s) will be used for downlink control channel communication on the component carrier, so that the UEs can receive control channel communications per subframe in the indicated time segment(s) on the component carrier. For instance, each base station may broadcast or otherwise transmit in its coverage area a system message, such as an LTE system information block (SIB), that specifies which time segment(s) per subframe the base station will use for downlink control channel communication on the component carrier. Provided with that information, served UEs may then scan for downlink control channel communication in the indicated time segment(s) on the component carrier rather than merely defaulting to use of the first one, two, or thee time segments per subframe as downlink control channel space on the component carrier. For instance, a UE may search for DCIs and HARQ messages in the indicated time segments on the component carrier.

Figure 5:
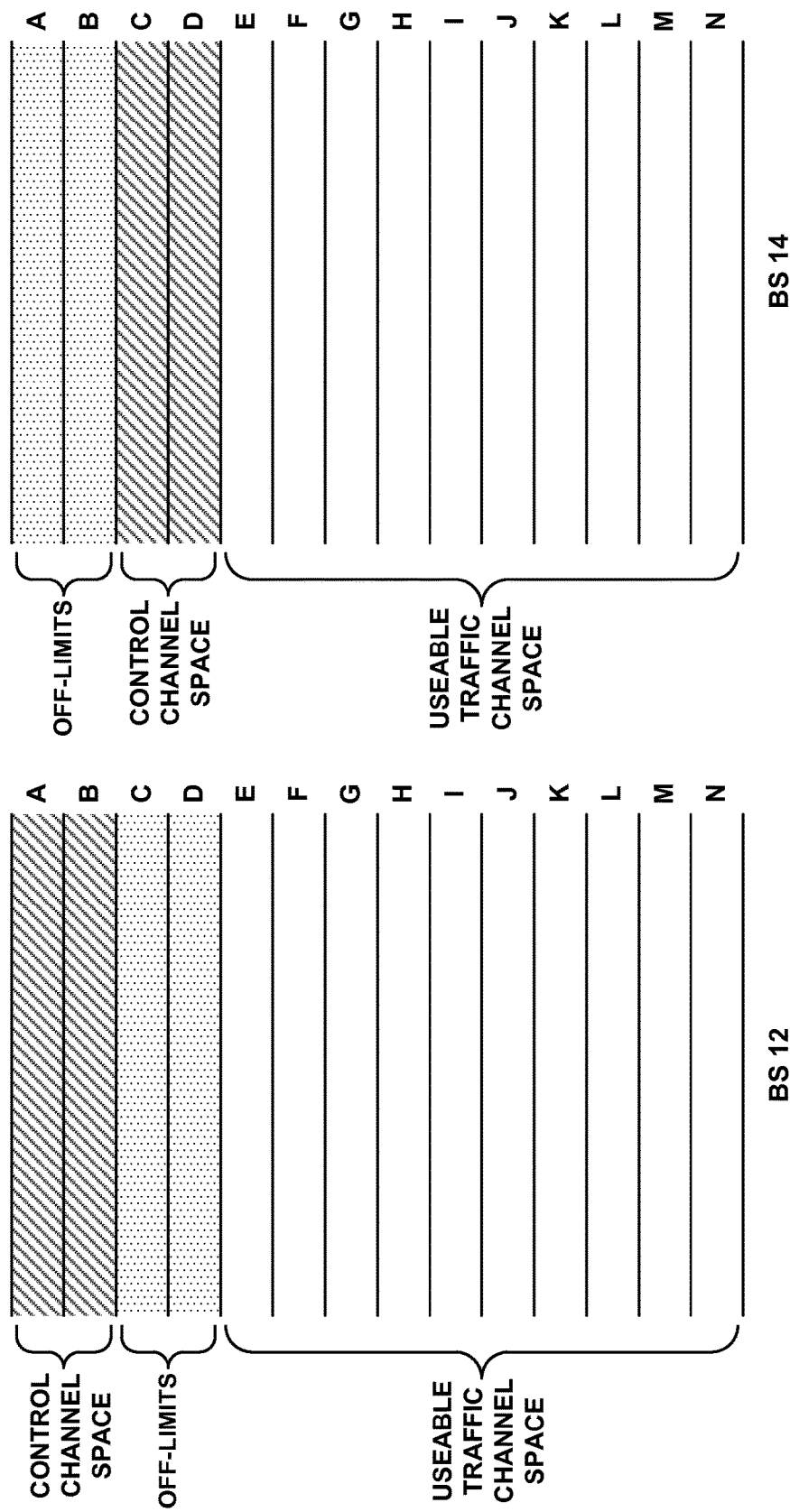
FIG. 5 is an illustration of time synchronized subframes of adjacent base station coverage areas but with the coverage areas using different time segments than each other for control channel space.

FIG. 5 illustrates one of many possible arrangements for use of time segments per subframe as between adjacent base stations in accordance with this process. In particular, FIG. 5 depicts the same subframe segments shown in FIG. 4, but depicts base station 12 as being set to use time segments A and B as its downlink control channel space, and base station 14 as being set to use time segments C and D as its downlink control channel space. (Although this example shows the base stations as using time segments at the start of a subframe, each base station in this process could be set to use various time segments per subframe. For instance, one base station could use time segments C and D, and the other base station could use time segments F and G. Further, as noted above, the time segments that a base station uses need not be contiguous.)

With this arrangement, base station 12 could then use remaining time segments C through N as its downlink traffic channel space, but base station 12 may advantageously forgo downlink traffic channel transmission in time segments C and D to help further reduce control channel interference for base station 14. Likewise, base station 14 could use remaining time segments A, B, and E through N as its downlink traffic channel space, but base station 14 may advantageously forgo downlink traffic channel transmission in time segments A and B to help further reduce control channel interference for base station 12. To facilitate this, when each base station allocates a particular resource block to a UE for downlink traffic channel communication, the base station may just not transmit in the time segments that the other base station is set to use for downlink control channel communication but may restrict its downlink traffic channel communication to the other remaining time segments.

In practice, this method can be applied with respect to various pairs of base stations in a representative wireless communication system. Further, the process in such a system could be iterative and could involve negotiation, accounting for the fact that a given base station may be adjacent to more than one other base station.

For instance, consider a scenario where a first base station sits between a second base station and a third base station. Through the present process, the first base station may determine that the second base station will be using particular time segments per subframe for downlink control channel communication on a given component carrier (e.g., by receiving a signal from the second base station indicating so, or by directing the second base station accordingly), and the first base station may responsively opt to use different time segments per subframe for downlink control channel communication on that component carrier. Further, the first base station may notify the third base station of the time segments per subframe that the first base station is going to use for downlink control channel communication on the component carrier and may similarly determine which time segments per subframe the second base station is going to use for downlink control channel communication on the component carrier, possibly one or more of the time same time segments that the second base station will be using for downlink control channel communication on the component carrier. Furthermore, in this arrangement, the first base station may then also forgo downlink traffic channel communication on the component carrier in both the one or more time segment(s) per subframe that the second base station is set to use for downlink control channel communication on the component carrier and in one or more time segment(s) per subframe that the third base station is set to use for downlink control channel communication on the component carrier.

With the present method applied on a particular component carrier, each base station may have a reduced extent of downlink traffic channel capacity, as each base station forgoes downlink traffic channel communication on the component carrier in the time segment(s) that one or more adjacent base stations will be using for downlink control channel communication on the component carrier. This may be fine in a scenario where the base station is not experiencing a high demand for downlink traffic channel communication on the component carrier. In a scenario where the base station experiences a threshold high level of load for downlink traffic channel communication on the component carrier (e.g., when its downlink data buffer for communication on the component carrier becomes more than a predefined high percentage full), the base station may then transition to provide downlink traffic channel communication on the component carrier in one or more of the time segment(s) that an adjacent base station is set to use for downlink control channel communication on the component carrier.

Further, in a scenario where the base station at issue has more than one adjacent base station, the base station may intelligently select one of the adjacent base stations for this purpose based on a consideration of load (perhaps specifically on the component carrier at issue) of each of the adjacent base stations. For instance, the base station may receive (perhaps regularly) indicia of load of the adjacent base stations, such as a report from each adjacent base station indicating its level of downlink control channel load and/or downlink traffic channel load (perhaps component-carrier specific). The base station at issue may then select the adjacent base station having the lowest indicated level of load (considering downlink control channel load and/or downlink traffic channel load), as being the adjacent base station that may be able to best withstand added downlink control channel interference on the component carrier. And the base station at issue may then transition to add to its set of time segments for downlink traffic channel communication on the component carrier one or more of the time segments that the selected adjacent base station is set to use for downlink control channel communication on the component carrier, possibly while continuing to avoid downlink traffic channel communication on the component carrier in any time segment(s) that one or more adjacent base stations would be using for downlink control channel communication on the component carrier.

In addition, having each base station forgo downlink traffic channel communication in the time segments that one or more adjacent base stations will be using for downlink control channel communication could pose an issue for certain types of data communications more than for others. For example, data communications that involve a lot of data being communicated at a high data rate, such as streaming video or gaming communications, may benefit from more traffic channel capacity and may experience reduced quality if there is insufficient traffic channel capacity. Likewise, latency-sensitive traffic such as real-time media streams may similarly benefit from higher traffic channel capacity and face issues with low traffic channel capacity. On the other hand, relatively small, connectionless or non-real-time communications such as e-mail communications or other best-efforts traffic may not suffer any perceivable problem when faced with traffic channel congestion.

Moreover, having the adjacent base stations use different time segments per subframe for their respective downlink control channel communications may benefit certain types of data communications more than others. For example, certain types of data, such as voice-over-IP data and streaming video data for instance, may be fairly persistent (i.e., ongoing or regularly transmitted), and a base station may be set to engage in persistent or semi-persistent scheduling of downlink transmission of such data. Such persistent or semi-persistent scheduling may involve transmitting to a UE a DCI that specifies a repeat scheduling directive, such as an indication that downlink transmission to the UE will occur in particular PDSCH resource blocks every particular number subframes or the like. Such persistent or semi-persistent scheduling may thus involve less control channel transmission overall, and may thus give rise to less likelihood of control channel interference between the base stations' coverage areas. Consequently, the present method may be less beneficial for such persistent or semi-persistent data communication. On the other hand, data communication that is less persistent, such as various connectionless and other best-efforts traffic, may benefit more from the present process.

Given these considerations, the present disclosure additionally provides for differentially structuring various component carriers on which adjacent base stations each serve one or more UEs with carrier-aggregation service, such as on CC1 and CC2 for instance, and allocating transmission of certain types of data to certain component carriers accordingly. In particular, in a scenario where adjacent base stations each serve one or more respective UEs on at least the same combination of component carriers CC1 and CC2, the base stations may apply the above process on CC1 but not on CC2 so that (i) the base stations would use different time segments per subframe than each other for downlink control channel communication on CC1, and may each forgo downlink traffic channel communication on CC1 in the time segments per subframe that the other base station will use for downlink control channel communication on CC1, but (ii) the base stations would use the same time segments per subframe as each other for downlink control channel communication on CC2 (e.g., both using at least the first one, two, or three default starting time segments per subframe for downlink control channel communication).

The result of this differential structuring may then be that the base stations may experience reduced control channel interference on CC1 but not on CC2, and that the base stations may have reduced traffic channel capacity (over time) on CC1 but not on CC2. With such an arrangement, in view of the considerations above, the base stations may then intentionally schedule less persistent and/or lower capacity data on CC1, and the base station may intentionally schedule more persistent and/or higher capacity data on CC2.

Figure 6:
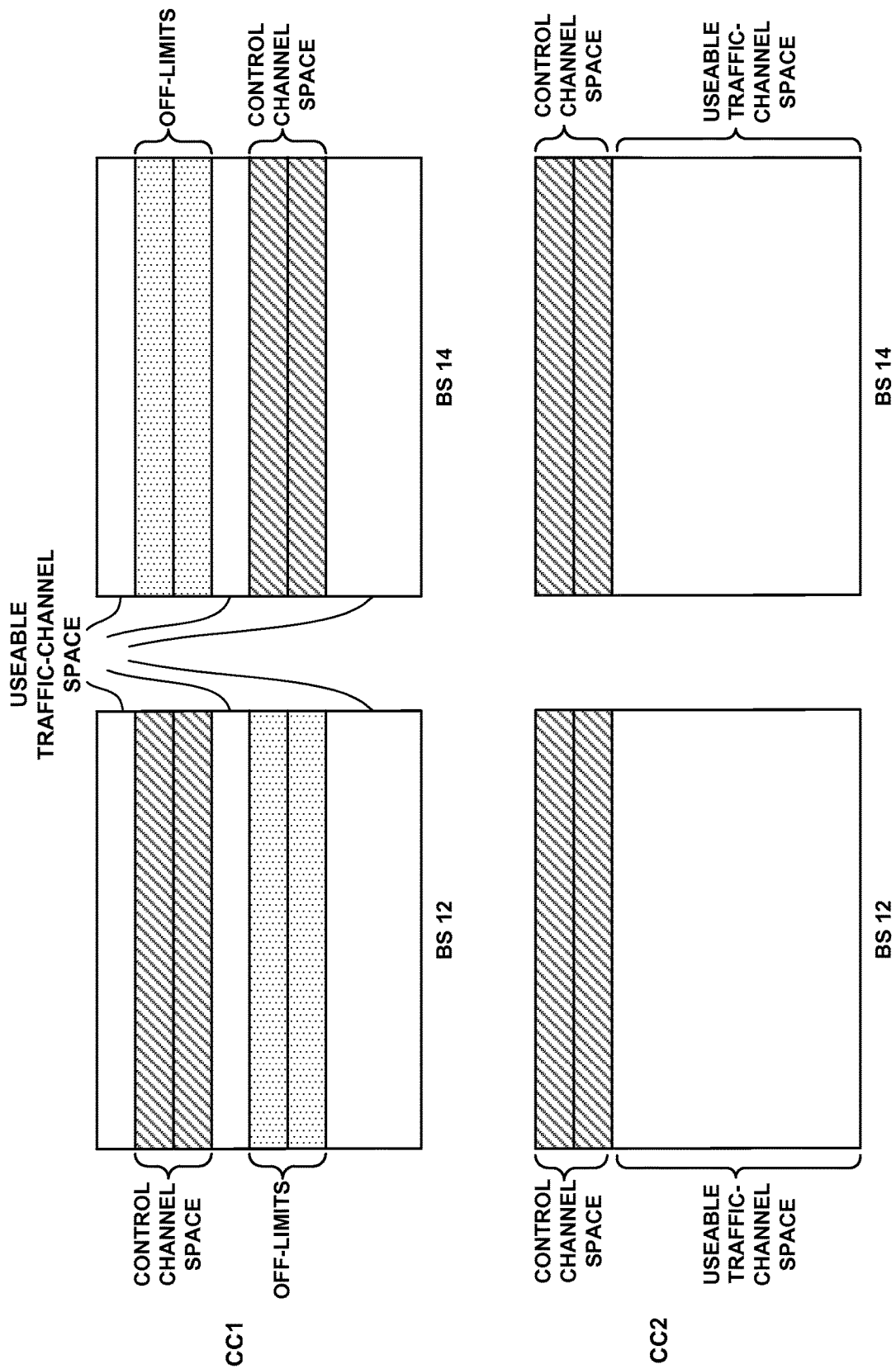
FIG. 6 is an illustration of example differential structuring of component carriers in accordance with the disclosure.

FIG. 6 depicts this arrangement by way of example. The illustration depicts at the top a comparison of CC1 time segment allocations of base station 12 and base station 14 and at the bottom a comparison of CC2 time segments allocation of base stations 12 and 14. Although the top and bottom depictions both represent a sequence of time segments from top down, it should be understood that the CC1 time segments would by aligned in time (concurrent) with the CC2 time segments. Due to space constraints for the figure, the top and bottom depictions are not shown side by side.

As shown in this example, the base stations are arranged to use different time segments than each other for their downlink control channel communication on CC1 and to not use for downlink traffic channel communication on CC1 the time segments that the other base station is set to use for downlink control channel communication on CC1. Further, as shown in the example, the base stations are arranged to use the same time segments as each other for their downlink control channel communication on CC2. (In practice, the number of time segments that the base stations use for downlink control channel communication on CC2 may differ between the base stations. For instance one base station may use the first two time segments per subframe, and the other may use the first three time segments per subframe. But the point here would be that the base stations would not arrange to use different time segments than each other per the above process.)

To facilitate this in practice, the base stations may provide their respective served UEs with a control message, such as a SIB message, that specifies the time segments per subframe that will be used for downlink control channel communication on CC1, whereas the base stations may provide their served UEs with a different control message, such as a physical control format indicator (PCFICH) value that specifies how many of the starting time segments per subframe on CC2 will be used for downlink control channel communication. In a carrier aggregation arrangement, a base station could provide these or other such control messages for each component carrier on that component carrier, or the base station could provide these or other such control messages for the component carriers on a given one of the component carriers, such as on the PCell. Other arrangements are possible as well.

This arrangement thus involves each base station differentially structuring the component carriers, by having different time segments than the other base station for downlink control channel communication on CC1 but having at least the same time segments as the other base station for downlink control channel communication on CC2.

Given this differential structuring of the component carriers and the considerations above, each base station may then intentionally schedule less persistent and/or lower capacity data (such as e-mail or other connectionless or best-efforts data) in resource blocks or other frequency segments on CC1 (and perhaps forgo scheduling such data on CC2) and may intentionally schedule more persistent and/or higher capacity data (such as voice-over-IP data and streaming video data for instance) in resource blocks or other frequency segments on CC2 (and perhaps forgo scheduling such data on CC1).

Note that with this arrangement, each base station would still be serving a respective given UE with carrier-aggregation service even if the UE is currently engaged in communication of just a particular type of data and thus if the base station is currently scheduling transmission of that data on just one of the component carriers. The fact of carrier-aggregation service may be established by the base station directing the UE to operate on the multiple component carriers (e.g., CC1 and CC2), with an RRC connection message for instance, in which case the UE may then be set to monitor control channel space on both component carriers—even though at the moment the base station is scheduling data transmission to the UE on just one of the component carriers. Further, with the same arrangement, a base station could concurrently transmit one type of data to the UE on CC1 and another type of data to the UE on CC2.

Figure 7:
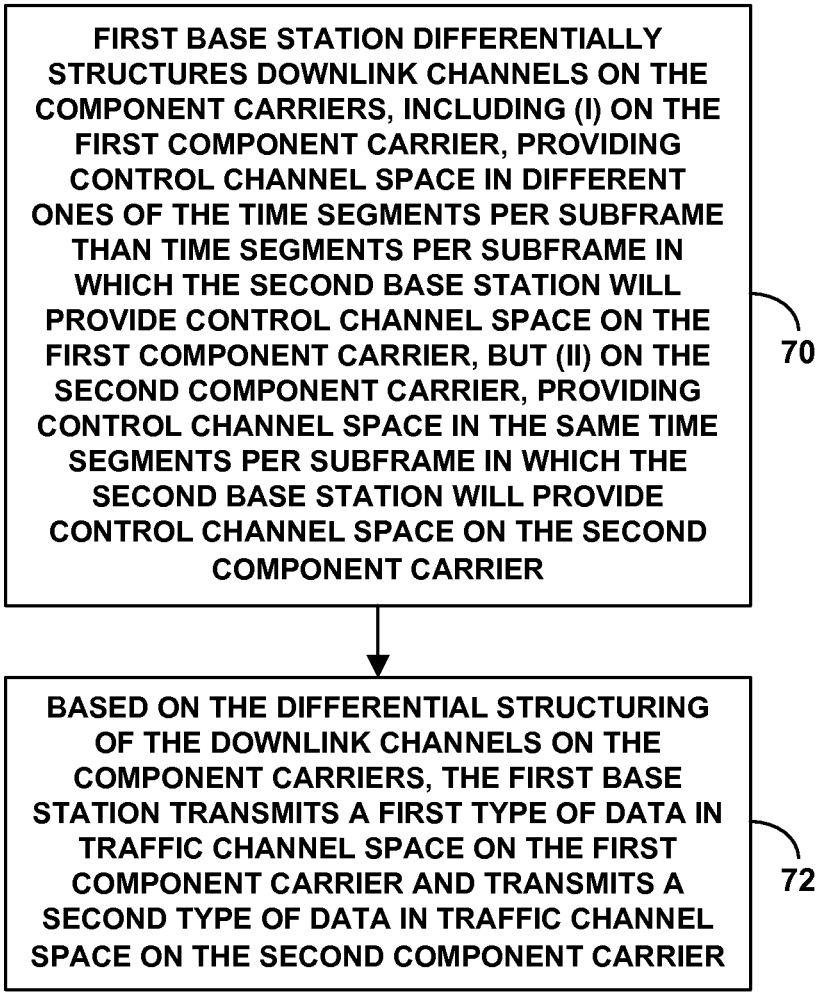
FIG. 7 is a flow chart depicting example operations in accordance with the disclosure.

FIG. 7 is next a flow chart depicting operations that can be carried out in accordance with the present disclosure, in a wireless communication system in which first and second adjacent base stations provide respective coverage areas in which to serve UEs, the base stations being time synchronized with each other for air interface communications in their respective coverage areas, each coverage area defining a continuum of subframes each divided into a sequence of time segments for communicating modulated data, and the first and second base stations both provide carrier-aggregation service on component carriers including a first component carrier and a second component carrier.

As shown in FIG. 7, at block 70, the first base station differentially structures downlink channels on the component carriers, including (i) on the first component carrier, providing control channel space in different ones of the time segments per subframe than time segments per subframe in which the second base station will provide control channel space on the first component carrier, but (ii) on the second component carrier, providing control channel space in the same time segments per subframe in which the second base station will provide control channel space on the second component carrier. Further, at block 72, based on the differential structuring of the downlink channels on the component carriers, the first base station transmits a first type of data in traffic channel space on the first component carrier and transmits a second type of data in traffic channel space on the second component carrier.

In line with the discussion above, the act of the first base station providing control channel space on the first component carrier in different ones of the time segments than time segments in which the second base station will provide control channel space on the first component carrier may take various forms. For instance, it may involve determining that the second base station will use particular ones of the time segments per subframe for downlink control channel communication on the first component carrier, and then, based on that determination, the first base station setting itself (i) to use one or more different ones of the time segments, other than the particular time segments, per subframe for downlink control channel communication on the first component carrier and (ii) to avoid downlink traffic channel communication in the one or more particular time segments per subframe on the first component carrier.

Further, the time segments per subframe in which the second base station will provide control channel space on the second component carrier are default control channel space time segments, such as a designated number of time segments starting at the beginning of each subframe. And in that case, the act of providing control channel space on the second component carrier in the same time segments per subframe in which the second base station will provide control channel space on the second component carrier may involve providing control channel space on the second component carrier in the default control channel space time segments.

Moreover, as a supplement to this process, the first base station could carry out the above-discussed variation in which, when the first base station detects a threshold high level of load for downlink traffic channel communication, the first base station may transition to begin providing downlink traffic channel communication in one or more time segments that the second base station will be using for downlink control channel communication. With the carrier-aggregation implementation, the first base station could do this specifically on CC1, and the threshold high level of load could take various forms, such as a threshold high level of load for downlink traffic channel communication by the first base station of the first type of data, such as a threshold high extent of the first type data to be transmitted to one or more UEs, and/or a threshold high level of congestion on CC1 in other ways.

FIG. 8 is next a simplified block diagram of an example base station, showing some of the components of such a base station to facilitate operation in accordance with the present disclosure, with the understanding that numerous variations are possible. As shown in FIG. 8, the example base station includes a wireless communication interface 80, a network interface (backhaul interface) 82, and a controller 84, with various ones of these or other components being communicatively linked together by a system bus, network, or other connection mechanism 76 or perhaps integrated together to some extent.

Wireless communication interface 80 may comprise a power amplifier 88, cellular transceiver 90, and antenna structure 92 and may function in combination to provide a coverage area with an air interface as described above. As such, the wireless communication interface 80 may be configured to receive data, generate symbols from the data, and transmit the symbols on the air interface, and to define on the air interface various channels such as a PDCCH and PDSCH as discussed above. Network interface 82 may then comprise a wired and/or wireless network communication interface (such as an Ethernet interface) through which the base station may communicate with other base stations and with various other network entities in line with the discussion above.

Controller 84, which may be integrated with transmitter 80 or one or more other components and may comprise one or more processing units programmed with instructions to carry out various functions, may then control the transmission of data, including control and user data, on the downlink air interface. For example, controller 84 may allocate downlink resource blocks to UEs and generate corresponding DCI messages, and controller 84 may control transmission by transmitter 80 accordingly. Further, controller 84 may implement features of the present method as discussed above, to manage which of the time segments per subframe the base station uses for downlink control channel communication and which of the time segments per subframe the base station uses for downlink traffic channel communication. Thus, the base station including such a controller would be configured to carry out such features.

With such an arrangement, in line with the discussion above, the controllers of adjacent first and second base stations may be configured to differentially structure downlink channels on the first and second component carriers on which the base stations both provide carrier aggregation service, with the differential structuring including (a) engaging in signaling with each other to arrange for (i) the first base station to use a first set of one or more of the time segments per subframe for downlink control channel communication on the first component carrier, and (ii) the second base station to use a second set of one or more of the time segments per subframe for downlink control channel communication on the first component carrier, but (b) both base stations being configured to use the same time segments per subframe as each other for downlink control channel communication on the second component carrier. Further, the controllers of both base station may be configured, based on the differential structuring of the downlink channels on the first and second component carriers, to transmit a first type of data in downlink traffic channel space on the first component carrier (i.e., to schedule such transmission) and to transmit a second type of data in downlink traffic channel space on the second component carrier (i.e., to schedule such transmission).

Exemplary embodiments have been described above. Those skilled in the art will understand, however, that changes and modifications may be made to these embodiments without departing from the true scope and spirit of the invention.

We claim:

1. In a wireless communication system in which first and second adjacent base stations provide respective coverage areas in which to serve user equipment devices (UEs), wherein the base stations are time synchronized with each other for air interface communications in their respective coverage areas, each coverage area defining a continuum of subframes each divided into a sequence of time segments for communicating modulated data, wherein the second base station provides carrier aggregation service on component carriers, a method comprising:

provide, by the first base station, carrier-aggregation service on the same component carriers on which the second base station provides carrier-aggregation service, the component carriers including a first component carrier and a second component carrier;

differentially structuring downlink channels on the component carriers, by the first base station, including (i) on the first component carrier, providing control channel space in different ones of the time segments per subframe than time segments per subframe in which the second base station will provide control channel space on the first component carrier, but (ii) on the second component carrier, providing control channel space in the same time segments per subframe in which the second base station will provide control channel space on the second component carrier; and based on the differential structuring of the downlink channels on the component carriers, transmitting by the first base station a first type of data in traffic channel space on the first component carrier and transmitting by the first base station a second type of data in traffic channel space on the second component carrier.

2. The method of claim 1, wherein providing control channel space on the first component carrier in different ones of the time segments than time segments in which the second base station will provide control channel space on the first component carrier comprises:

determining that the second base station will use particular ones of the time segments per subframe for downlink control channel communication on the first component carrier, and based on the determination that the second base station will use the particular time segments per subframe for downlink control channel communication on the first component carrier, the first base station setting itself (i) to use one or more different ones of the time segments, other than the particular time segments, per subframe for downlink control channel communication on the first component carrier and (ii) to avoid downlink traffic channel communication in the one or more particular time segments per subframe on the first component carrier.

3. The method of claim 2, wherein the time segments per subframe in which the second base station will provide control channel space on the second component carrier are default control channel space time segments, and wherein providing control channel space on the second component carrier in the same time segments per subframe in which the second base station will provide control channel space on the second component carrier comprises providing control channel space on the second component carrier in the default control channel space time segments.

4. The method of claim 3, wherein the default control channel space time segments are a designated number of time segments starting at a beginning of each subframe.

5. The method of claim 2, wherein each component carrier defines a respective frequency bandwidth, each respective frequency bandwidth defining, per subframe, a sequence of frequency segments for carrying downlink traffic channel communication, the method further comprising:

allocating, by the first base station, one or more of the frequency segments in a given subframe on the first component carrier for downlink traffic channel communication of the first type of data, wherein, due to the avoiding of downlink traffic channel communication in the one or more particular time segments per subframe on the first component carrier, the first base station limits downlink traffic channel communication in the allocated one or more frequency segments to be in just one or more time segments other than the one or more particular time segments.

6. The method of claim 2, further comprising:

detecting by the first base station a threshold high level of load for downlink traffic channel communication by the first base station of the first type of data; and responsive to detecting the threshold high level of load, transitioning by the first base station to provide downlink traffic channel communication on the first component carrier in the one or more time segments that the first base station determined the second base station will use for downlink control channel communication.

7. The method of claim 2, wherein determining that the second base station will use particular ones of the time segments per subframe for downlink control channel communication on the first component carrier comprises:

engaging in inter-base-station signaling with the second base station to make an arrangement for the first base station and the second base station to use different ones of the time segments per subframe for their respective downlink control channel communication on the first component carrier, wherein avoiding downlink traffic channel communication in the one or more particular time segments based on the determination that that the second base station will use the particular time segments per subframe for downlink control channel communication on the first component carrier comprises avoiding downlink traffic channel communication in one or more time segments that the particular second base station will use for control channel communication on the first component carrier in accordance with the arrangement for the first base station and particular second base station to use different ones of the time segments per subframe for their respective control channel communication on the first component carrier.

8. The method of claim 1, further comprising:

providing, by the first base station, to one or more UEs served by the first base station, an indication of which one or more time segments per subframe the first base station will be using for downlink control channel communication on the first component carrier, to enable the one or more UEs served by the first base station to receive downlink control channel communication from the first base station in the indicated one or more time segments per subframe on the first component carrier.

9. The method of claim 1, wherein each base station's provided coverage area defines an orthogonal frequency division multiple access air interface, and wherein the time segments are symbol time segments.

10. The method of claim 8, wherein downlink control channel communication comprises physical downlink control channel (PDCCH) communication.

11. The method of claim 1, transmitting the first type of data in traffic channel space on the first component carrier and transmitting the second type of data in traffic channel space on the second component carrier is based at least in part on the first type of data being less persistently scheduled than the second type of data.

12. A wireless communication system comprising:
   a first base station configured to provide a first coverage area on first and second component carriers, wherein the first coverage area defines a continuum of subframes each divided into a sequence of time segments for communicating modulated data on the component carriers; and
   a second base station configured to provide a second coverage area on the same first and second component carriers, wherein the second coverage area defines the same continuum of subframes each divided into the sequence of time segments for carrying modulated data,
   wherein the first coverage area overlaps with the second coverage area, and wherein the base stations are time synchronized with each other for air interface communications in their respective coverage areas,
   wherein the first and second base stations are configured to differentially structure downlink channels on the first and second component carriers, wherein differentially structuring downlink channels on the first and second component carriers comprises (a) engaging in signaling with each other to arrange for (i) the first base station to use a first set of one or more of the time segments per subframe for downlink control channel communication on the first component carrier, and (ii) the second base station to use a second set of one or more of the time segments per subframe for downlink control channel communication on the first component carrier, but (b) both base stations being configured to use the same time segments per subframe as each other for downlink control channel communication on the second component carrier, and
   wherein, the first and second base stations are further configured, based on the differential structuring of the downlink channels on the first and second component carriers, to transmit a first type of data in downlink traffic channel space on the first component carrier and to transmit a second type of data in downlink traffic channel space on the second component carrier.

13. The wireless communication system of claim 12,
   wherein the first base station is configured to transmit to the second base station a signal indicating that the first base station will use the first set of one or more of the time segments per subframe for downlink control channel communication on the first component carrier and to receive from the second base station a signal indicating that the second base station will use the second set of one or more of the time segments per subframe for downlink control channel communication on the first component carrier, and
   wherein the second base station is configured to receive from the first base station the signal indicating that the first base station will use the first set of one or more of the time segments per subframe for downlink control channel communication on the first component carrier and to transmit to the first base station the signal indicating that the second base station will use the second set of one or more of the time segments per subframe downlink control channel communication on the first component carrier.

14. The wireless communication system of claim 13,
   wherein the first base station is configured to respond to the signal received from the second base station by avoiding use of the second set of one or more of the time segments per subframe for downlink traffic channel communication on the first component carrier, and
   wherein the second base station is configured to respond to the signal received from the first base station by avoiding use of the first set of one or more of the time segments per subframe for downlink traffic channel communication on the first component carrier.

15. The wireless communication system of claim 14,
   wherein each of the first and second component carriers defines a respective frequency bandwidth, each respective frequency bandwidth defining, per subframe, a sequence of frequency segments for carrying downlink traffic channel communication,
   wherein the first base station avoiding use of the second set of time segments per subframe for downlink traffic channel communication on the first component carrier comprises, in one or more downlink resource blocks allocated by the first base station for carrying downlink traffic channel communication on the first component carrier, the first base station limiting downlink traffic channel communication to just one or more time segments other than the second set of time segments, and
   wherein the second base station avoiding use of the first set of time segments per subframe for downlink traffic channel communication on the first component carrier comprises, in one or more downlink resource blocks allocated by the second base station for carrying downlink traffic channel communication on the first component carrier, the second base station limiting downlink traffic channel communication to just one or more time segments other than the first set of time segments.

16. The wireless communication system of claim 12,
   wherein the first base station is further configured to notify one or more user equipment devices (UEs) served by the first base station that the first base station will provide downlink control channel communication on the first component carrier in the first set of one or more of the time segments, and
   wherein the second base station is further configured to notify one or more UEs served by the second base station that the second base station will provide downlink control channel communication on the first component carrier in the second set of one or more of the time segments.

17. The wireless communication system of claim 12, wherein the first base station is further configured to detect a threshold high level of load for downlink traffic channel communication from the first base station on the first component carrier and, responsive to detecting the threshold high level of load for downlink traffic channel communication from the first base station on the first component carrier, to transition to begin providing downlink traffic channel communication in the second set of one or more of the time segments on the first component carrier.

18. The wireless communication system of claim 17, wherein each of the first and second coverage areas defines an orthogonal frequency division multiple access air interface, wherein the time segments are symbol time segments, wherein the downlink control channel communication comprises physical downlink control channel (PDCCH) communication, and wherein downlink traffic channel communication comprises physical downlink shared channel (PDSCH) communication.

19. The wireless communication of claim 12, wherein the transmitting of the first type of data in downlink traffic channel space on the first component carrier and of the second type of data in downlink traffic channel space on the second component carrier is based further on the first type of data being less persistently scheduled than the second type of data.

20. A first base station comprising:
- a wireless communication interface configured to provide a wireless coverage area in which to serve user equipment devices (UEs) with carrier-aggregation service on a plurality of component carriers including a first component carrier and a second component carrier, wherein, on each component carrier, the coverage area defines a continuum of subframes each divided into a sequence of time segments for communicating modulated data; and
- a controller configured to differentially structure downlink channels on the component carriers, including (i) on the first component carrier, providing control channel space in different ones of the time segments per subframe than time segments per subframe in which an adjacent second base station will provide control channel space on the first component carrier, but (ii) on the second component carrier, providing control channel space in the same time segments per subframe in which the adjacent second base station will provide control channel space on the second component carrier, wherein the first base station and the adjacent second base station are time synchronized with each other for air interface communications, and wherein the controller is configured, based on the differential structuring of the downlink channels on the component carriers, (i) to cause the base station to transmit a first type of data in traffic channel space on the first component carrier due to the first type of data being of the first type, and (ii) to cause the base station to transmit a second type of data in the traffic channel space on the second component carrier due to the second type of data being of the second type.

\* \* \* \* \*